United States Patent
Kim et al.

(10) Patent No.: US 12,175,369 B2
(45) Date of Patent: Dec. 24, 2024

(54) ELECTRONIC DEVICE FOR KEY FRAME ANALYSIS AND CONTROL METHOD THEREOF

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Kyungsu Kim, Suwon-si (KR); Sungjin Kim, Suwon-si (KR); Yunjae Jung, Daejeon (KR); In-so Kweon, Daejeon (KR); Dahun Kim, Daejeon (KR); Sanghyun Woo, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 425 days.

(21) Appl. No.: 17/554,142

(22) Filed: Dec. 17, 2021

(65) Prior Publication Data

US 2022/0108550 A1 Apr. 7, 2022

Related U.S. Application Data

(63) Continuation of application No. PCT/KR2020/007554, filed on Jun. 11, 2020.

(Continued)

(30) Foreign Application Priority Data

Sep. 3, 2019 (KR) .................. 10-2019-0108907

(51) Int. Cl.
*G06N 3/084* (2023.01)
*G06F 18/214* (2023.01)
(Continued)

(52) U.S. Cl.
CPC .......... *G06N 3/084* (2013.01); *G06F 18/214* (2023.01); *G06N 3/044* (2023.01); *G06N 3/045* (2023.01);
(Continued)

(58) Field of Classification Search
CPC ........ G06N 3/084; G06N 3/045; G06N 3/044; G06F 18/214; G06V 10/454; G06V 10/82; G06V 20/46; G06V 30/19
See application file for complete search history.

(56) References Cited

U.S. PATENT DOCUMENTS 9,760,978 B1    9/2017   Lu et al.
9,916,679 B2    3/2018   Flynn et al.
(Continued)

FOREIGN PATENT DOCUMENTS

KR    10-2014-0112839 A    9/2014
KR    10-1787613 B1         11/2017
(Continued)

OTHER PUBLICATIONS

Huang et al., "Visual Storytelling," arXiv:1604.03968v1, [cs.CL], Apr. 13, 2016, p. 1-7. (Year: 2016).*

(Continued)

*Primary Examiner* — Amandeep Saini
*Assistant Examiner* — Daniella M. DiGuglielmo
(74) *Attorney, Agent, or Firm* — Sughrue Mion, PLLC

(57) ABSTRACT

An electronic device and a method thereof are provided. The electronic device includes: a memory and a processor configured to: acquire feature data of a plurality of images in a video using a first artificial neural network of a first artificial intelligence model; acquire a plurality of key frames of the video based on the feature data of the plurality of images using a second artificial neural network of the first artificial intelligence model; acquire first feature data of remaining (Continued)

key frames excluding at least one of the plurality of key frames using a first artificial neural network of a second artificial intelligence model; acquire second feature data including information about relationships between the remaining key frames based on the first feature data using a second artificial neural network of the second artificial intelligence model; and acquire texts for the plurality of key frames based on the second feature data.

16 Claims, 7 Drawing Sheets

Related U.S. Application Data

(60) Provisional application No. 62/862,783, filed on Jun. 18, 2019.

(51) Int. Cl.
  *G06N 3/044* (2023.01)
  *G06N 3/045* (2023.01)
  *G06V 10/44* (2022.01)
  *G06V 10/82* (2022.01)
  *G06V 20/40* (2022.01)
  *G06V 30/19* (2022.01)

(52) U.S. Cl.
  CPC ............ *G06V 10/454* (2022.01); *G06V 10/82* (2022.01); *G06V 20/46* (2022.01); *G06V 30/19* (2022.01)

(56) References Cited

U.S. PATENT DOCUMENTS

| | | |
|---|---|---|
| 10,395,118 B2 | 8/2019 | Yu et al. |
| 2014/0279814 A1 | 9/2014 | Park et al. |
| 2016/0104077 A1 | 4/2016 | Jackson, Jr. et al. |
| 2017/0127016 A1* | 5/2017 | Yu .......................... G06N 3/084 |
| 2018/0189615 A1 | 7/2018 | Kang et al. |
| 2019/0014320 A1* | 1/2019 | Navarrete Michelini ................... H04N 19/124 |
| 2019/0163702 A1 | 5/2019 | Garg et al. |
| 2020/0242402 A1 | 7/2020 | Jung et al. |
| 2020/0380263 A1* | 12/2020 | Yang ...................... G06V 20/46 |

FOREIGN PATENT DOCUMENTS

| | | |
|---|---|---|
| KR | 10-1855597 B1 | 5/2018 |
| KR | 10-2018-0065498 A | 6/2018 |
| KR | 10-2018-0080098 A | 7/2018 |
| KR | 10-1930940 B1 | 12/2018 |
| KR | 10-2019-0016367 A | 2/2019 |
| KR | 10-2019-0062030 A | 6/2019 |

OTHER PUBLICATIONS

Huang, Ting-Hao (Kenneth) et al., "Visual Storytelling", arXiv:1604.03968v1, [cs.CL], Apr. 13, 2016. (7 pages total).

International Search Report (PCT/ISA/210) issued Sep. 16, 2020 by the International Searching Authority in counterpart International Patent application No. PCT/KR2020/007554.

Written Opinion (PCT/ISA/237) issued Sep. 16, 2020 by the International Searching Authority in counterpart International Patent application No. PCT/KR2020/007554.

* cited by examiner

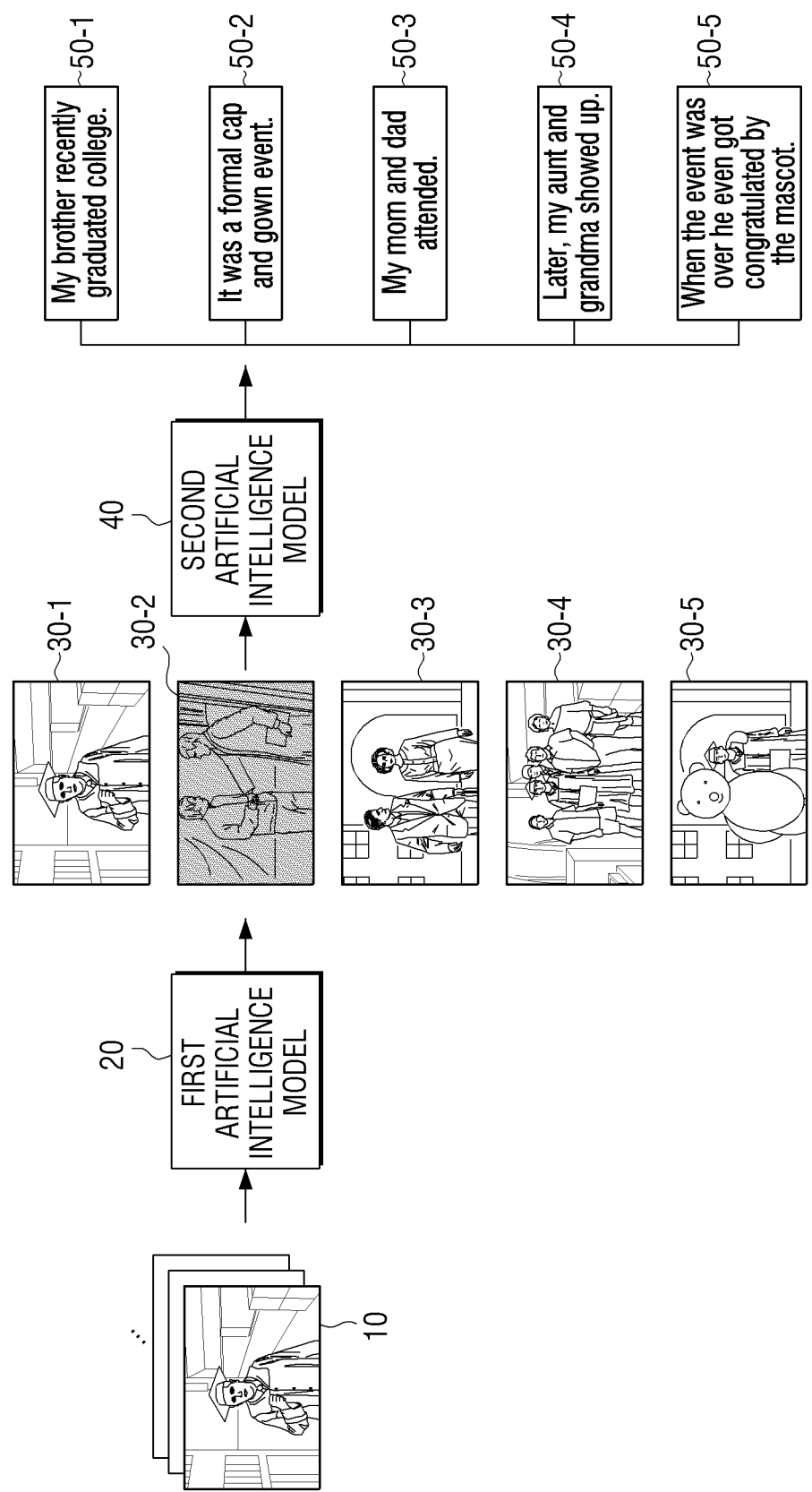

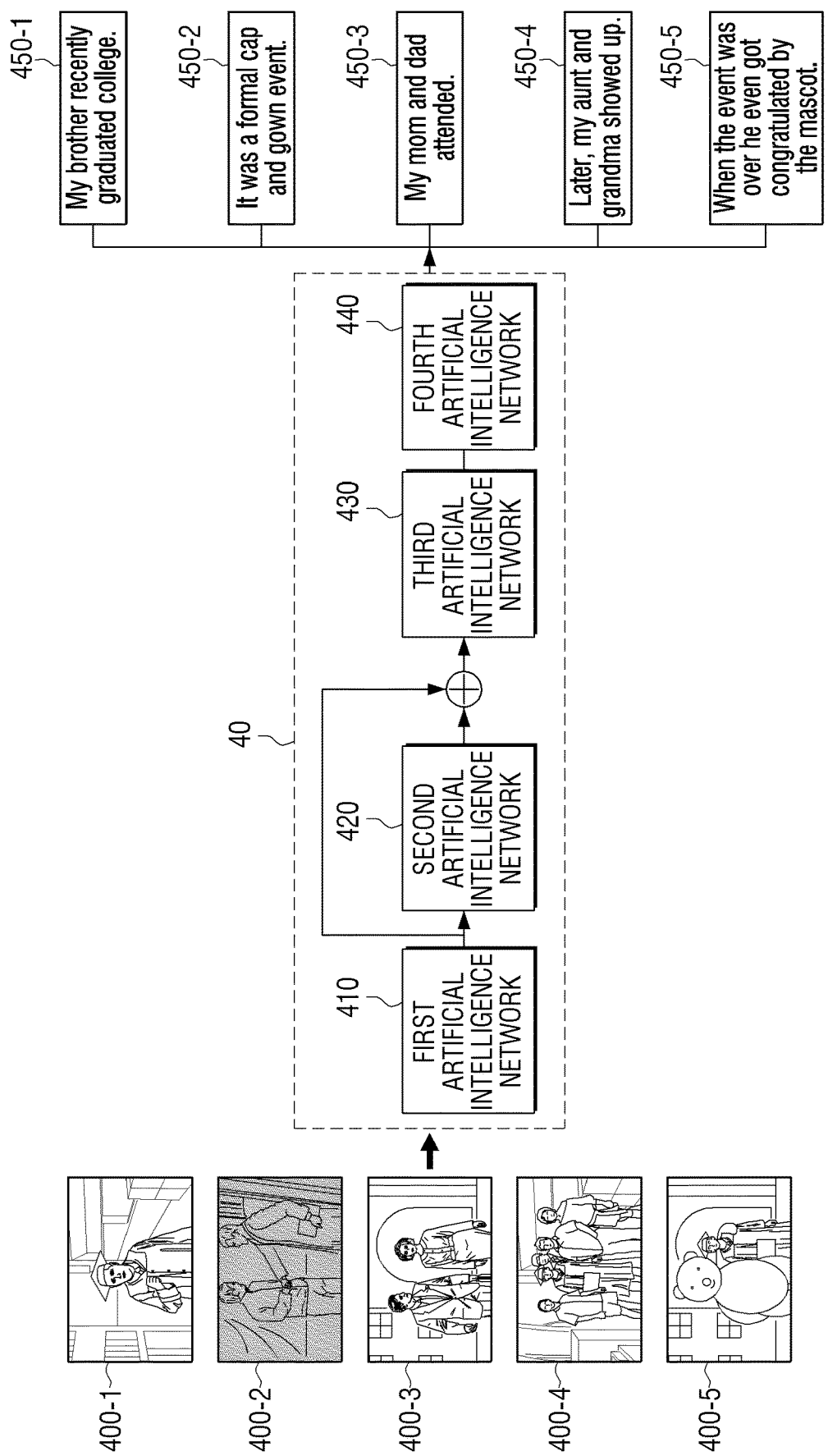

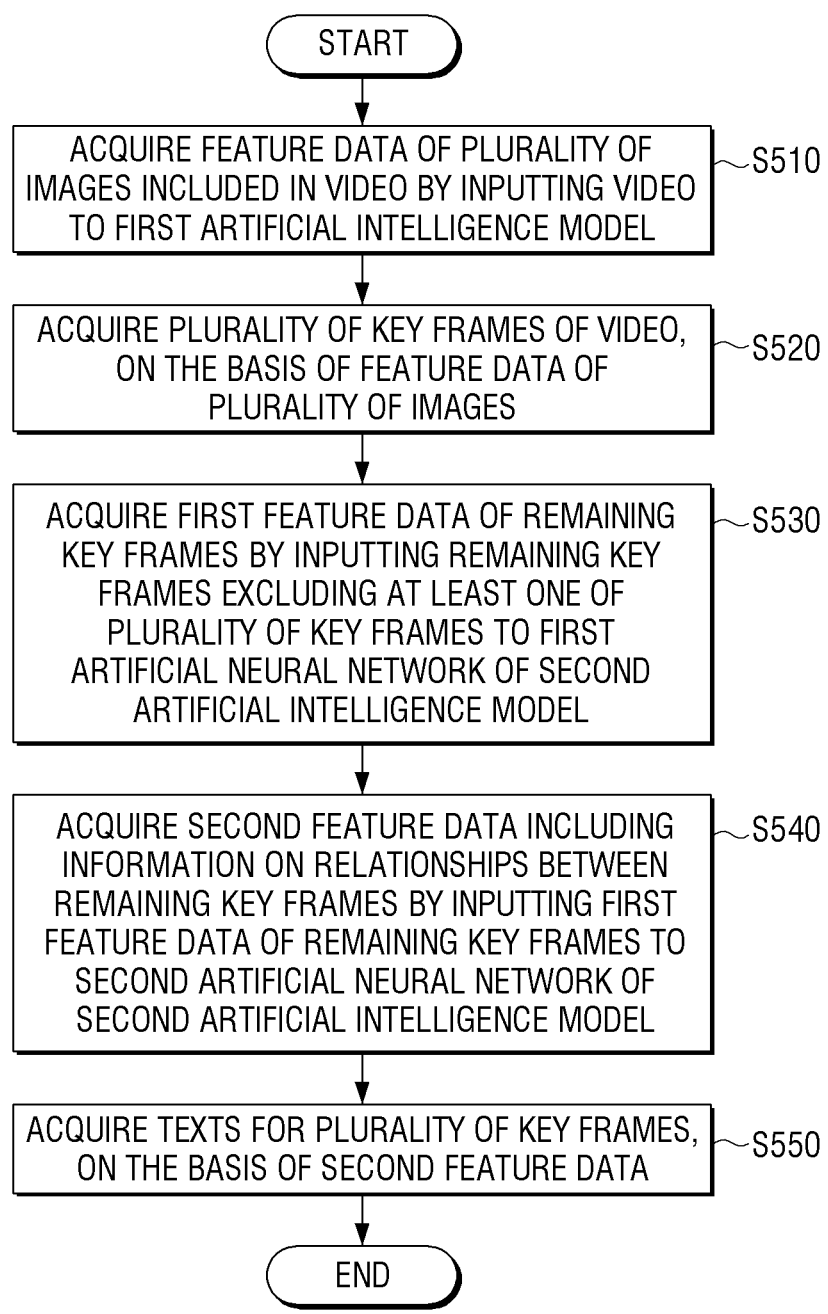

ELECTRONIC DEVICE FOR KEY FRAME ANALYSIS AND CONTROL METHOD THEREOF

CROSS-REFERENCE TO RELATED APPLICATION(S)

This application is a bypass continuation of International PCT Application No. PCT/KR2020/007554, filed Jun. 11, 2020, which is based on and claims priority to U.S. Provisional Application No. 62/862,783, filed Jun. 18, 2019 in the United States Patent and Trademark Office, and Korean Patent Application No. 10-2019-0108907, filed Sep. 3, 2019 in the Korean Intellectual Property Office, the disclosures of which are incorporated by reference herein in their entirety.

BACKGROUND

1. Field

The disclosure relates to an electronic device and a control method of the same, and more particularly, to an electronic device that acquires a key frame of a video and a text for the key frame, and a control method of the same.

2. Description of Related Art

An artificial intelligence (AI) system is a computer system that implements human-level intelligence using a machine that learns, determines and becomes smarter by itself, unlike a conventional rule-based smart system. As the use of AI system increases, the AI system can improve its recognition rate to understand a user's preference more accurately. Thus, AI system based on a deep learning has been gradually replacing the conventional rule-based smart system.

The artificial intelligence technology may include machine learning (e.g., deep learning) and an element technique using the machine learning.

The machine learning is an algorithm of classifying/learning features of input data by a machine, and the element technique is a technique of simulating functions such as recognition and determination of a human brain by using the machine training algorithm such as the deep learning, and may be applied to technical fields such as linguistic understanding, visual understanding, inference/prediction, knowledge representation and an action control. In particular, the linguistic understanding is a technique of recognizing and applying/processing human languages, and includes natural language processing, machine translation, a dialog system, question and answer, speech recognition/synthesis, etc.

Over many years, a research on a video captioning or storytelling technique that generates an explanatory sentence for an image by integrating the visual understanding and linguistic understanding of the image has been actively conducted.

In case of a conventional technique, the conventional technique learns all images first and then acquires texts for the learned images. However, in case that the video captioning or storytelling is performed using the conventional technique, there is a limitation in which a text matching an actual image may not be generated. For example, a sentence for a feature yet to appear in a current image may be generated in an attempt to match a contextual flow between the images, and the generated sentence may be an inaccurate representation of the actual images.

SUMMARY

An aspect of the disclosure is to provide an electronic device that acquires a key frame of a video, on the basis of the action and scene feature data of a plurality of images included in the video, and texts for all the key frames, on the basis of remaining key frames excluding at least one of the key frames, and a control method thereof.

According to an embodiment, there is provided an electronic device including: a memory that stores at least one instruction; and a processor that is connected to the memory and configured to execute the at least one instruction to: acquire feature data of a plurality of images included in a video using a first artificial neural network of a first artificial intelligence model; acquire a plurality of key frames of the video based on the feature data of the plurality of images using a second artificial neural network of the first artificial intelligence model; acquire first feature data of remaining key frames excluding at least one of the plurality of key frames using a first artificial neural network of a second artificial intelligence model; acquire second feature data including information about relationships between the remaining key frames based on the first feature data using a second artificial neural network of the second artificial intelligence model; and acquire texts for the plurality of key frames based on the second feature data.

The feature data includes action feature data and scene feature data of the plurality of images.

The processor is further configured to: acquire a frame level score of each of the plurality of images based on the action feature data and the scene feature data using the second artificial neural network of the first artificial intelligence model, and identify one or more key frames of the video from among the plurality of images based on the frame level score.

The processor is further configured to identify the one or more key frames based on an image having the frame level score greater than a threshold value.

The first artificial neural network of the first artificial intelligence model is a recurrent neural network connected to a convolutional neural network, and the second artificial neural network of the first artificial intelligence model is a neural network connected to a non-local neural network.

The processor is further configured to train the first artificial intelligence model based on the action feature data and the scene feature data of the acquired plurality of key frames.

The processor is further configured to: acquire third feature data including feature data of at least one excluded key frame among the plurality of key frames based on data obtained by adding the first feature data and the second feature data of the remaining key frames, using a third artificial neural network of the second artificial intelligence model, and acquire texts for the plurality of key frames based on the third feature data using a fourth artificial neural network of the second artificial intelligence model.

In the trained artificial intelligence model, the first artificial neural network of the second artificial intelligence model is a convolutional neural network, each of the second artificial neural network and the third artificial neural network of the second artificial intelligence model is a neural network in which a non-local neural network is connected to a recurrent neural network, and the fourth artificial neural network of the second artificial intelligence model is the recurrent neural network.

The second artificial neural network of the second artificial intelligence model has a same structure as the third artificial neural network, and includes a different parameter.

The processor is further configured to train the second artificial intelligence model based on the texts for the acquired plurality of key frames.

According to an embodiment, there is provided a control method of an electronic device. The method includes: acquiring feature data of a plurality of images included in a video using a first artificial neural network of a first artificial intelligence model; acquiring a plurality of key frames of the video based on the feature data of the plurality of images using a second artificial neural network of the first artificial intelligence model; acquiring first feature data of remaining key frames excluding at least one of the plurality of key frames using a first artificial neural network of a second artificial intelligence model; acquiring second feature data including information about relationships between the remaining key frames based on the first feature data using a second artificial neural network of the second artificial intelligence model; and acquiring texts for the plurality of key frames, on the basis of the second feature data.

The feature data includes action feature data and scene feature data of the plurality of images.

The acquiring the plurality of key frames of the video includes: acquiring a frame level score of each of the plurality of images based on the action feature data and the scene feature data using the second artificial neural network of the first artificial intelligence model, and identifying one or more key frames of the video from among the plurality of images based on the frame level score.

The acquiring the plurality of key frames of the video further includes identifying the one or more key frames based on an image having the frame level score greater than a threshold value.

The first artificial neural network of the first artificial intelligence model is a recurrent neural network connected to a convolutional neural network, and the second artificial neural network of the first artificial intelligence model is a neural network connected to a non-local neural network.

As set forth above, according to the various embodiments of the disclosure, the electronic device may acquire the key frame of the video on the basis of the action feature data and scene feature data of the image in the video, and may acquire the texts for all the key frames, on the basis of the key frames excluding the at least one of the key frames, thereby making it possible for a user to receive accurate text describing the video.

BRIEF DESCRIPTION OF THE DRAWINGS

FIG. 1 is a diagram showing an overall operation of an electronic device according to an embodiment of the disclosure.

FIG. 4 is a diagram showing an operation of a second artificial intelligence model included in the electronic device according to an embodiment of the disclosure.

FIG. 5 is a diagram showing a control method of an electronic device according to an embodiment of the disclosure.

DETAILED DESCRIPTION

Figure 2A:
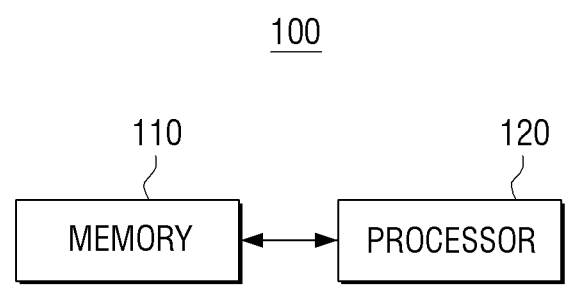
FIG. 2A is a block diagram schematically showing a configuration of the electronic device according to an embodiment of the disclosure.

Hereinafter, embodiments of the disclosure will be described in detail with reference to the accompanying drawings.

FIG. 1 is a diagram showing an overall operation of an electronic device 100 according to an embodiment of the disclosure.

As shown in FIG. 1, the electronic device 100 according to an embodiment of the disclosure may acquire feature data of a plurality of images included in a video 10 by inputting the video 10 to a first artificial intelligence model 20. Specifically, the electronic device 100 may acquire the feature data of the plurality of images, which include the action feature data and scene feature data of the plurality of images by inputting the video 10 to a first artificial neural network of the first artificial intelligence model 20.

An artificial neural network included in each artificial intelligence model included in the electronic device 100 of the disclosure may include a plurality of layers. Each layer may have a plurality of weight values, and a calculation by a layer may be performed based on a calculation result of a previous layer and the plurality of weight values. A weight value may be a parameter that controls a degree to which an input value changes. For example, one or more weight values may be updated based on outputs results, and the updated weight values may be used to perform calculations on an input value.

In an embodiment, the first artificial neural network of the first artificial intelligence model 20 may be an artificial neural network in which a recurrent neural network is connected to a convolutional neural network. Additionally or alternatively, the first artificial neural network of the first artificial intelligence model 20 may also be implemented as a deep neural network (DNN), a restricted Boltzmann machine (RBM), a deep belief network (DBN), a bidirectional recurrent deep neural network (BRDNN), etc.

In addition, the action feature data may include data related to feature of an action of an object included in the image. In an embodiment, it may be assumed that an image in which the object is stopped and an image in which the object is stopped and then moves, are included in the plurality of images included in the video. In this case, the electronic device 100 may acquire the action feature data including feature data of the image in which the object is stopped and feature data of the image in which the object moves by using the first artificial neural network of the first artificial intelligence model.

Moreover, the scene feature data may include data related to a feature of a place or environment displayed in the image. In an embodiment, it may be assumed that an image of a basketball court and an image of a basketball stand are included in the plurality of images. In this case, the electronic device 100 may acquire the scene feature data including feature data of the image in which a place is the basketball court and feature data of the image in which a place is the basketball stand by using the first artificial neural network of the first artificial intelligence model.

The electronic device 100 according to an embodiment may acquire a frame level score of each of the plurality of images by inputting the action feature data and scene feature data of the plurality of images to a second artificial neural network of the first artificial intelligence model. In an embodiment, the electronic device 100 may acquire a numerical value used for determining whether each image is a key frame indicating a major feature of the video by comparing the action feature data and scene feature data of the images to each other by using the second artificial neural network of the first artificial intelligence model 20. That is, the electronic device 100 may acquire the key frame indicating the major feature from the plurality of images included in the video by using the action feature and scene feature of the plurality of images included in the video.

The second artificial neural network of the first artificial intelligence model may be a neural network connected to a non-local neural network. The non-local neural network is an artificial neural network that acquires feature data of the input data and data on relationships between respective feature data by performing the calculation (or non-local operation) on an entire region of input data, rather than a specific region thereof. A detailed description of the non-local neural network is described in detail with reference to FIG. 3B.

The frame level score may refer to the numerical value used for the electronic device 100 to determine whether each image is the key frame of the video. In addition, the key frame may refer to an image that indicates a start and an end of a single action of the object in the video, which may indicate an important feature of the video. That is, the key frame may include an image indicating that the action of the object or a change in the place in which the object is positioned starts or ends, among the plurality of images included in the video.

The electronic device 100 may identify the key frame of the video from the plurality of images, on the basis of the frame level score of the each acquired image. In an embodiment, the electronic device 100 may identify and acquire images, each image having the frame level score greater than a threshold value from the plurality of images as a plurality of key frames 30-1, 30-2, . . . and 30-5 of the video. FIG. 1 shows the plurality of acquired key frames 30-1, 30-2, . . . and 30-5 of the video having 5 chapters as an example.

The electronic device 100 may train the first artificial intelligence model, on the basis of the action feature data and scene feature data of the acquired key frame. That is, the electronic device 100 may train the first artificial intelligence model, on the basis of two feature data of the key frame. For example, the electronic device 100 may train the first artificial intelligence model by respectively comparing the action feature data and scene feature data of the acquired key frames with the action feature data and scene feature data of key frames of an actual video (or key frames of a video input from a user). In an embodiment, the electronic device 100 may train the first artificial intelligence model by applying a backpropagation algorithm to the acquired key frame. The electronic device 100 may train the first artificial intelligence model 20 by using various algorithms (e.g., a stochastic gradient descent algorithm, a momentum algorithm, an AdaGrad algorithm and an Adam algorithm).

The electronic device 100 may acquire first feature data of remaining key frames by inputting the remaining key frames excluding at least one 30-2 of the plurality of key frames 30-1, 30-2, 30-3, 30-4 or 30-5 to a first artificial neural network of a second artificial intelligence model 40. FIG. 1 shows that one key frame is excluded from the plurality of key frames 30-1 to 30-5, but, two or more key frames may be excluded. In an embodiment, the electronic device 100 may change the number of the excluded key frames based on the number of learning times of the second artificial intelligence model 40. The first artificial neural network of the second artificial intelligence model 40 may be the convolutional neural network.

In addition, the electronic device 100 may acquire second feature data including information about relationships between the remaining key frames by inputting the first feature data of the remaining key frames to the second artificial neural network of the second artificial intelligence model 40. In an embodiment, the second artificial neural network of the second artificial intelligence model 40 may be a neural network in which the non-local neural network is connected to the recurrent neural network. In addition, the second feature data of the remaining key frames may include data related to relationships between the first feature data of the remaining key frames.

The electronic device 100 may acquire texts 50-1, 50-2, 50-3, 50-4 and 50-5 for the plurality of key frames 30-1 to 30-5, on the basis of the second feature data of the remaining key frames. Specifically, the electronic device 100 may acquire third feature data including feature data of the at least one excluded key frame 30-2 by inputting data obtained by adding the first feature data and second feature data of the remaining key frames together, to a third artificial neural network of the second artificial intelligence model 40. For example, the electronic device 100 may use the second feature data which indicates the relationships between the remaining key frames and the first feature data of the remaining key frames to infer and acquire the feature data of the excluded image 30-2. The third artificial neural network of the second artificial intelligence model 40 may have a neural network structure in which the non-local neural network is connected to the same recurrent neural network as the second artificial neural network of the first artificial intelligence model 20, and may include a parameter different from that of the second artificial neural network.

In addition, the electronic device 100 may acquire the texts 50-1 to 50-5 for all the plurality of key frames by inputting the third feature data to a fourth artificial neural network of the second artificial intelligence model 40. That is, electronic device 100 may acquire the texts 50-1 to 50-5 for all the key frames even though at least one of the plurality of key frames is excluded by the second artificial intelligence model 40. FIG. 1 shows that the electronic device 100 excludes the one key frame 30-2 from the plurality of key frames. However, the electronic device 100 still may acquire the text 50-2 (e.g., "It was a formal cap and gown event") for the excluded key frame 30-2 by the second artificial intelligence model 40. In an embodiment, a fourth artificial neural network of the second artificial intelligence model 40 may be the recurrent neural network.

The electronic device 100 may train the second artificial intelligence model 40 based on the texts 50-1 to 50-5 for the plurality of acquired key frames. Specifically, the electronic device 100 may train the second artificial intelligence model by comparing the texts 50-1, 50-2, 50-3, 50-4 and 50-5 for the acquired key frames with texts for actual key frames (or information on texts for the key frames input from the user). In an embodiment, the electronic device 100 may train the second artificial intelligence model by applying the back-propagation algorithm to the texts 50-1 to 50-5 for the acquired key frames. The electronic device 100 may train the second artificial intelligence model 40 by using various algorithms (e.g., the stochastic gradient descent algorithm, the momentum algorithm, the AdaGrad algorithm and the Adam algorithm).

Figure 2B:
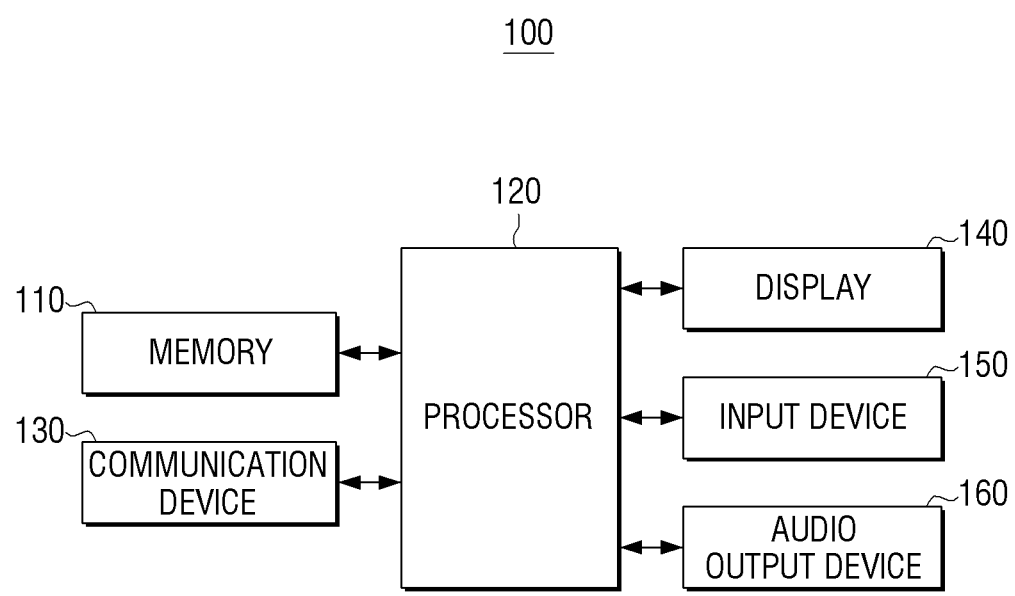
FIG. 2B is a block diagram schematically showing a detailed configuration of the electronic device according to an embodiment of the disclosure.

FIGS. 2A and 2B are block diagrams schematically showing a configuration of the electronic device 100 according to an embodiment of the disclosure. As shown in FIG. 2A, the electronic device 100 may include a memory 110 and a processor 120. The configuration shown in FIG. 2A is an example diagram for implementing the embodiments of the disclosure, and the electronic device 100 may further include various hardware/software configurations that may be obvious to those skilled in the art.

The memory 110 may store an instruction or data related to at least one another component of the electronic device 100. The instruction may be an action statement for the electronic device 100 in a programming language, and is the smallest unit of a program that the electronic device 100 may directly execute.

In particular, the memory 110 may be implemented as a non-volatile memory, a volatile memory, a flash memory, a hard disc drive (HDD), a solid state drive (SSD), etc. The memory 110 may be accessed by the processor 120, and the processor 120 may perform readout, recording, correction, deletion, update and the like of data therein. In the disclosure, the term "memory" may include the memory 110, a read only memory (ROM, not shown) and a random access memory (RAM) in the processor 120, or a memory card mounted on the electronic device 100 (e.g., a micro secure digital (SD) card or a memory stick).

In particular, the memory 110 may store the first artificial intelligence model that may acquire the key frame from the video and the second artificial intelligence model that may acquire the text for the key frame. In addition, the memory 110 may store the input and output data from the plurality of artificial neural networks included in each artificial intelligence model.

The processor 120 may be electrically connected to the memory 110 and may control the overall operation and function of the electronic device 100. In particular, the processor 120 may acquire the feature data of the plurality of images included in the video by inputting the video to the first artificial intelligence model by executing at least one instruction stored in the memory 110. The processor 120 may acquire the feature data of the plurality of images, which include the action feature data and scene feature data of the plurality of images, by inputting the video to the first artificial neural network of the first artificial intelligence model.

The processor 120 may acquire the frame level score of each of the plurality of images by inputting the action feature data and scene feature data of the plurality of images to the second artificial neural network of the first artificial intelligence model. For example, the processor 120 may acquire the frame level score, which is a numerical value used for determining whether each image indicates a change in the object included in the video, by comparing the action feature and the scene feature which are included in the plurality of images.

In addition, the processor 120 may identify and acquire the key frame of the video from the plurality of images based on the frame level score of each image. In an embodiment, the processor 120 may identify and acquire the image having the frame level score greater than the threshold value from the plurality of images as the key frame of the video.

The processor 120 may train the first artificial intelligence model based on the action feature data and scene feature data of the acquired key frame. For example, the processor 120 may train the first artificial intelligence model by comparing the action and scene feature data of the actual key frames (or information on the key frames of the video input from the user) with the action and scene feature data of the acquired key frames. In an embodiment, the processor 120 may use the backpropagation algorithm as a training algorithm applied to the acquired key frame.

Moreover, the processor 120 may acquire the first feature data of the remaining key frames by inputting the remaining key frames excluding at least one of the plurality of acquired key frames to the first artificial neural network of the second artificial intelligence model. In an embodiment, the processor 120 may change the number of the key frames excluded from the plurality of key, on the basis of the number of the learning times of the second artificial intelligence model 40. The processor 120 may increase the number of the key frames excluded from the plurality of key frames as the second artificial intelligence model has the increased number of the learning times.

In addition, the processor 120 may acquire the second feature data including the information on the relationships between the remaining key frames by inputting the first feature data of the remaining key frames to the second artificial neural network of the second artificial intelligence model. The second feature data may include information on the relationships between the first feature data of the remaining key frames, information on a rate of a change between respective remaining key frames, etc.

In addition, the processor 120 may acquire the texts for all the plurality of key frames based on the second feature data. Specifically, the processor 120 may acquire the third feature data including the feature data of the at least one excluded key frame by inputting data obtained by adding the first feature data and second feature data of the remaining key frames together, to the third artificial neural network of the second artificial intelligence model. That is, the processor 120 may infer and acquire the feature data of the excluded key frame, on the basis of the information on the relationships between the remaining key frames and the first feature data of the remaining key frames. In addition, the processor 120 may acquire the texts for all the plurality of key frames by inputting the third feature data including the feature data of the remaining key frames to the fourth artificial neural network of the second artificial intelligence model.

The processor 120 may train the second artificial intelligence model based on the texts for the acquired key frames. Specifically, the processor 120 may train the second artificial intelligence model by comparing the texts for the acquired key frames with the texts for the actual key frames (or the texts for the key frames input from the user). In addition, the processor 120 may use the backpropagation algorithm as the algorithm applied to the text for the acquired key frame. The processor 120 may train the second artificial intelligence model by applying the various algorithms.

The processor 120 may include one or more processors. Here, the one or more processors 120 may be a general-purpose processor such as a central processing unit (CPU) or an application processor (AP) or the like; a graphics-only processor such as a graphics-processing unit (GPU) or a visual processing unit (VPU); or an AI-only processor such as a neural processing unit (NPU).

The one or more processors may process the input data based on a predefined action rule or the artificial intelligence model stored in the memory 110. The predefined action rule or the artificial intelligence model may be a feature acquired by learning.

Here, "acquired by learning" may indicate that the predefined action rule or artificial intelligence model of a desired feature is acquired by applying a training algorithm to a lot of training data. Such learning may be performed on a device itself on which the artificial intelligence is performed according to the disclosure, or by a separate server/system.

The training algorithm is a method that trains a predetermined target device (e.g., a robot) by using a large number of training data for the predetermined target device may make a decision or make a prediction by itself. The training algorithms may include, for example, a supervised learning algorithm, an unsupervised learning algorithm, a semi-supervised learning algorithm, or a reinforcement learning algorithm. However, the training algorithm of the disclosure is not limited to the above-described examples, unless specifically indicated otherwise.

FIG. 2B is a block diagram schematically showing a detailed configuration of the electronic device 100 according to an embodiment of the disclosure. As shown in FIG. 2B, the electronic device 100 may include the memory 110, the processor 120, a communication device 130, a display 140 and an input device 150. The memory 110 and the processor 120 are already described with reference to FIG. 2A, and the redundant description thereof will be omitted.

The communication device 130 may communicate with an external device by various communication methods. The communication device 130 may be communicatively connected with the external apparatus by a third device (e.g., a repeater, a hub, an access point, a server or a gateway).

The communication device 130 may include various communication modules to perform the communication with the external device. For example, the communication device 130 may include a wireless communication module. The communication device 130 may include, for example, a cellular communication module using at least one of long-term evolution (LTE), LTE Advance (LTE-A), code division multiple access (CDMA), wideband CDMA (WCDMA), universal mobile telecommunications system (UMTS), wireless broadband (WiBro) or global system for mobile communications (GSM). For another example, the wireless communication module may include, at least one of wireless fidelity (WiFi), Bluetooth, Bluetooth low energy (BLE) or Zigbee.

The display 140 may display various information under control of the processor 120. In particular, the display 140 may display the video, the key frame and the text corresponding to the key frame under the control of the processor 120.

In addition, the display 140 may also be implemented as a touch screen along with a touch panel. However, the display 140 is not limited to the above-described implementation type, and may be implemented differently based on a type of the electronic device 100.

The input device 150 may receive various inputs from the user and transmit the same to the processor 120. In particular, the input device 150 may include a touch sensor, a pen sensor, a pressure sensor, a key or a microphone. The touch sensor may use, for example, at least one of a capacitive type, a pressure sensitive type, an infrared type or an ultrasonic type. The pen sensor may be, for example, a portion of the touch panel or may include a separate sheet for recognition. The pen sensor may also include a digital pen sensor.

In an embodiment, when the key frame of the video and the text for the key frame are input from the user for training each artificial intelligence model stored in the memory 110, the input device 150 may receive a signal of the input key frame and text for the key frame and transmit the same to the processor 120.

The audio output device 160 is a component that outputs various sound, alarms or audio messages as well as various audio data on which various processing operations such as decoding, amplification and noise filtering are performed by an audio processor. In an embodiment, the audio output device 160 may output the alarm indicating that the texts corresponding to the plurality of key frames are output.

The audio output device 160 may be include a speaker, and may be implemented as another output terminal capable of outputting audio data.

Figure 3A:
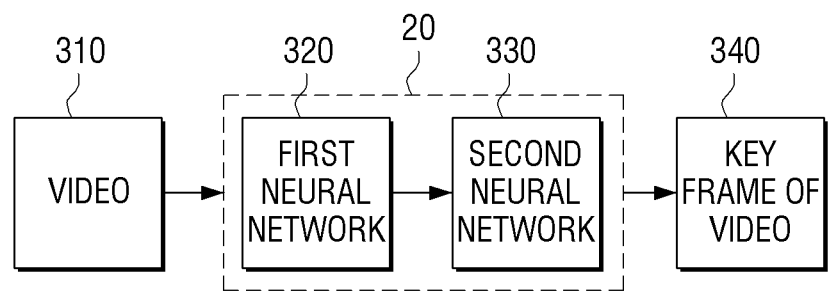
FIG. 3A is a diagram showing an operation of a first artificial intelligence model included in the electronic device according to an embodiment of the disclosure.

FIG. 3A is a diagram showing a configuration of the first artificial intelligence model 20 included in the electronic device 100 according to an embodiment of the disclosure. The first artificial intelligence model 20 shown in FIG. 3A may be controlled by the processor 120.

First, when a video 310 is input, a first artificial neural network 320 of the first artificial intelligence model 20 may output the feature data of the plurality of images included in the video. In an embodiment, the first artificial neural network 320 of the first artificial intelligence model 20 may classify the feature data of the plurality of acquired images into the action feature data and the scene feature data.

The first artificial neural network 320 of the first artificial intelligence model 20 may be implemented as the artificial neural network in which the recurrent neural network is connected to the convolutional neural network. In addition, the feature data of the plurality of images may each be implemented in the form of a vector or matrix.

The first artificial neural network 320 of the first artificial intelligence model 20 may input the feature data of the plurality of images, which are classified into the action feature data and the scene feature data, to a second artificial neural network 330 of the first artificial intelligence model 20. The second artificial neural network 330 of the first artificial intelligence model 20 may be implemented as the non-local neural network.

The second artificial neural network 330 of the first artificial intelligence model 20 may output the frame level score of each of the plurality of images based on the input action feature data and scene feature data from the first artificial neural network 320. The second artificial neural network 330 of the first artificial intelligence model 20 may compare the feature data of the plurality of images to each other to output the frame level score, which is the numerical value of whether each image may indicate the change in the object included in the video.

In addition, the processor 120 may identify and acquire a key frame 340 of the video from the plurality of images based on the frame level score. For example, the processor 120 may identify and acquire an image among the plurality of images having the frame level score greater than the threshold value from the plurality of images as the key frame 340 of the video.

The processor 120 may train the first artificial intelligence model 20 based on the action feature data and scene feature data of the acquired key frame. The operation of the processor 120 training the first artificial intelligence model 20 is already described with reference to FIG. 2A, and the redundant description thereof will be omitted.

Figure 3B:
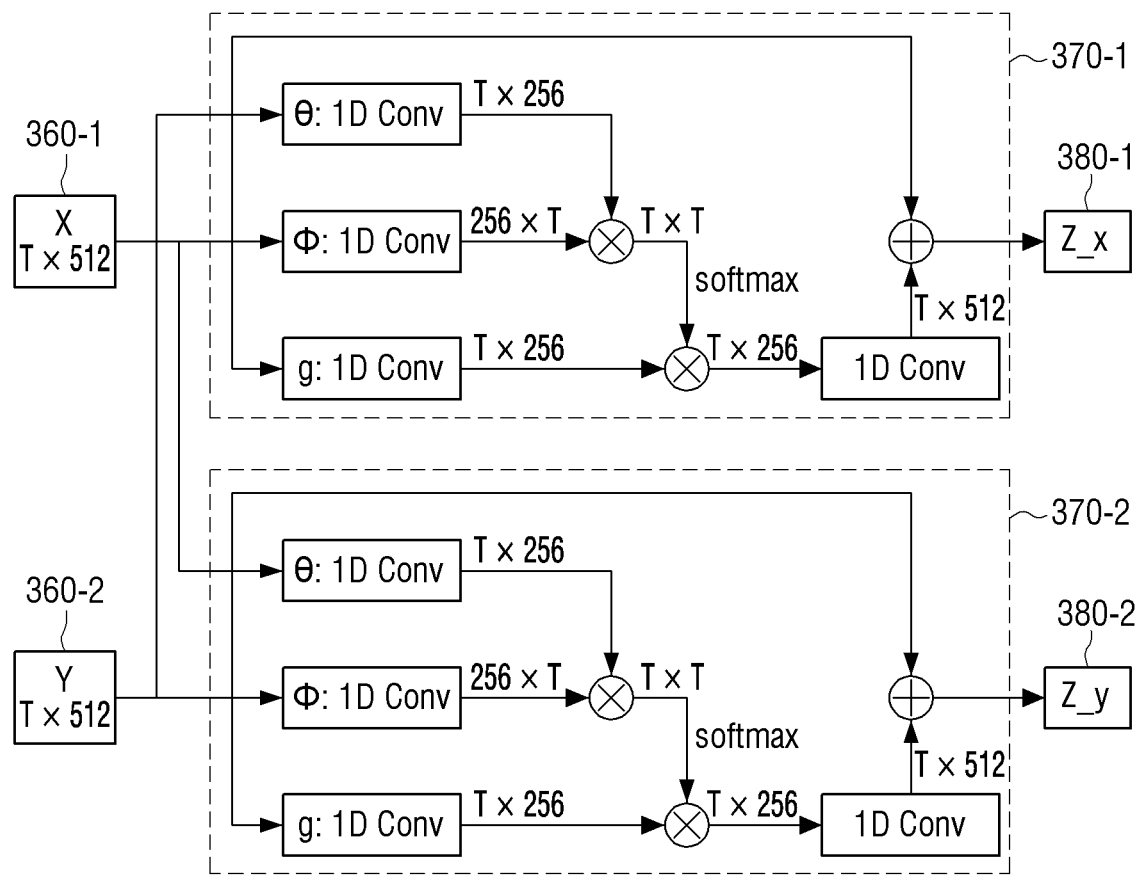
FIG. 3B is a diagram showing an operation of a second artificial neural network of the first artificial intelligence model included in the electronic device according to an embodiment of the disclosure.

FIG. 3B is a diagram showing a second artificial neural network of the first artificial intelligence model included in the electronic device 100 according to an embodiment of the disclosure.

As shown in FIG. 3B, the second artificial neural network of the first artificial intelligence model may be implemented as the non-local artificial neural network. The action feature data 360-1 and scene feature data 360-2 of the plurality of images may each be implemented as a matrix (in the form of a matrix of T (e.g., predetermined value)×512). In addition, the action feature data 360-1 and the scene feature data 360-2 of the plurality of images may be respectively input to a plurality of layers 370-1 and 370-2 included in the second artificial neural network of the first artificial intelligence model. A non-local calculation (or non-local operation) of the non-local artificial neural network is a known technique, and a calculation process is thus omitted.

The second artificial neural network of the first artificial intelligence model may output feature vectors 380-1 and 380-2 for each of the input action feature data 360-1 and the scene feature data 360-2. In addition, the second artificial neural network of the first artificial intelligence model may compare the feature vectors 380-1 and 380-2 for each of the plurality of acquired images to output the frame level score of each of the plurality of images.

FIG. 4 is a diagram showing a configuration of a second artificial intelligence model 40 included in the electronic device 100 according to an embodiment of the disclosure. The second artificial intelligence model 40 may be controlled by the processor 120.

In an embodiment, a plurality of key frames 400-1 to 400-5 of the video, acquired by the first artificial intelligence model, may be input to the second artificial intelligence model 40. FIG. 4 shows the plurality of key frames acquired by the first artificial intelligence model having 5 chapters as an example. However, the plurality of key frames may be less than 5 or more than 5.

It may be assumed that the remaining key frames, from which at least one of the plurality of key frames 400-1 to 400-5 is excluded, are input under the control of the processor 120. In this case, a first artificial neural network 410 of the second artificial intelligence model 40 may output the first feature data of each of the remaining key frames. The first artificial neural network 410 of the second artificial intelligence model 40 may be implemented as the convolutional neural network.

In addition, when the first feature data of each of the remaining key frames is input, a second artificial neural network 420 of the second artificial intelligence model 40 may output the second feature data including the information on the relationships between the remaining key frames. The second feature data may include information about the relationships between the remaining key frames. The second artificial neural network 420 of the second artificial intelligence model 40 may be the neural network in which the non-local neural network is connected to the recurrent neural network, which is only an example.

In addition, when the data obtained by adding the first feature data and the second feature data together is input, a third artificial neural network 430 of the second artificial intelligence model 40 may output the third feature data including the feature data of the at least one excluded key frame. That is, the third artificial neural network 430 of the second artificial intelligence model 40 may use the information about the relationships between the remaining key frames and the first feature data of the remaining key frames to infer and output the feature data of the excluded key frame. The third artificial neural network 430 of the second artificial intelligence model 40 may have the neural network structure in which the non-local neural network is connected to the same recurrent neural network as the second artificial neural network 420 of the second artificial intelligence model 40, and may include the parameter different from that of the second artificial neural network.

In addition, when the third feature data is input, a fourth artificial neural network 440 of the second artificial intelligence model 40 may output texts for all the plurality of key frames 450-1 to 450-5. That is, although the key frames from which at least one key frame 400-2 of the plurality of key frames is excluded is input, the second artificial intelligence model 40 may use the information about the relationships between the remaining key frames and the first feature data of the remaining key frames to infer the feature data of the excluded key frame 400-2, and may output the corresponding text 450-2 ("It was a formal cap and gown event").

In an embodiment, the fourth artificial neural network 440 of the second artificial intelligence model 40 may be implemented as the recurrent neural network. In addition, the fourth artificial neural network 440 of the second artificial intelligence model 40 may acquire the text for each key frame by decoding the third feature data.

The processor 120 may train the second artificial intelligence model 40 by using the text for the acquired key frame. The process in which the processor 120 trains the second artificial intelligence model 40 is already described with reference to FIG. 2A, and the redundant description is thus omitted.

In addition, the processor 120 may increase the number of the key frames excluded from the plurality of key frames 400-1 to 400-5 based on the number of the learning times of the second artificial intelligence model 40. In an embodiment, the processor 120 may exclude one key frame from the plurality of key frames, and may exclude two key frames in case that the second artificial intelligence model 40 learns up to a predetermined epoch.

FIG. 5 is a diagram showing a control method of an electronic device 100 according to an embodiment of the disclosure.

First, the electronic device 100 may acquire feature data of a plurality of images included in a video by inputting the video to a first artificial intelligence model (S510). Specifically, the electronic device 100 may acquire the feature data of the plurality of images by inputting the video to a first artificial neural network of the first artificial intelligence model. In addition, the electronic device 100 may classify the feature data of the plurality of images into action feature data and scene feature data. That is, the feature data of the plurality of images may include the action feature data and scene feature data of the plurality of images.

The electronic device 100 may acquire a plurality of key frames of the video based on the feature data of the plurality of images (S520). For example, the electronic device 100 may acquire a frame level score of each of the plurality of images by inputting the action feature data and scene feature data to a second artificial neural network of the first artificial intelligence model. In an embodiment, the electronic device 100 may acquire a numerical value used for determining whether each image clearly indicates the feature of a change in an object included in the video by comparing the action feature data and scene feature data of the plurality of images to each other, using the second artificial neural network of the first artificial intelligence model.

In addition, the electronic device 100 may acquire the plurality of key frames of the video, on the basis of the frame level score. The electronic device 100 may identify and acquire an image having the frame level score greater than a threshold value from the plurality of images as the key frame of the video.

The electronic device 100 may train the first artificial intelligence model, on the basis of the action feature data and scene feature data of the acquired key frame. Moreover, the electronic device 100 may train the first artificial intelligence model by respectively comparing the action feature data and scene feature data of the acquired key frames with action feature and scene feature data of predefined key frames of a video input from a user.

In addition, the electronic device 100 may acquire first feature data of remaining key frames by inputting the remaining key frames excluding at least one of the plurality of key frames to a first artificial neural network of the second artificial intelligence model (S530). In an embodiment, the electronic device 100 may increase the number of key frames to be excluded from the plurality of key frames, based on the number of learning times of the second artificial intelligence model. For example, as the number of learning times of the second artificial intelligence model increases, the number of key frames to be excluded from the plurality of key frames may also increase.

In addition, the electronic device 100 may acquire second feature data including information about relationships between the remaining key frames by inputting the first feature data of the remaining key frames to a second artificial neural network of the second artificial intelligence model (S540).

In addition, the electronic device 100 may acquire texts for the plurality of key frames based on the second feature data (S550). Specifically, the electronic device 100 may acquire third feature data including feature data of the at least one excluded key frame by inputting data obtained by adding the first feature data and the second feature data of the remaining key frames together, to a third artificial neural network of the second artificial intelligence model, in which the second feature data includes the information about the relationships between the remaining key frames. That is, the electronic device 100 may infer and acquire the feature data of the excluded key frame, on the basis of the data of the remaining key frames.

In addition, the electronic device 100 may acquire texts for all the plurality of key frames by inputting the third feature data to a fourth artificial neural network of the second artificial intelligence model.

The electronic device 100 may train the second artificial intelligence model based on the plurality of acquired key frames. That is, the electronic device 100 may train the second artificial intelligence model by comparing the texts for the plurality of key frames with texts for predefined plurality of key frames input from the user.

The embodiments of the disclosure may be diversely modified, and the scope of the disclosure is not limited to the specific embodiments of the disclosure shown in the drawings and described in the description. That is, it is to be understood that the embodiments of the disclosure are not limited to the specific embodiments, but may include various modifications, equivalents, and/or alternatives according to the embodiments of the disclosure. Throughout the accompanying drawings, similar components are denoted by similar reference numerals.

Terms used in the disclosure are used only to describe the specific embodiments rather than limiting the scope of the disclosure. Singular forms used herein are intended to include plural forms unless explicitly indicated otherwise.

In the disclosure, an expression "have," "may have," "include," "may include" or the like, indicates existence of a corresponding feature (for example, a numerical value, a function, an operation, a component such as a part), and does not exclude existence of an additional feature.

In the disclosure, an expression "A or B," "at least one of A and/or B," "one or more of A and/or B" or the like, may include all possible combinations of elements enumerated. For example, "A or B," "at least one of A and B," or "at least one of A or B" may indicate all of 1) a case in which at least one A is included, 2) a case in which at least one B is included, or 3) a case in which both of at least one A and at least one B are included.

Expressions "first," "second" and the like, used in the disclosure may indicate various components regardless of a sequence and/or importance of the components. These expressions are only used in order to distinguish one component from the other components, and do not limit the corresponding components.

If any component (for example, a first component) is mentioned to be (operatively or communicatively) coupled with/to or connected to another component (for example, a second component), it is to be understood that the any component is directly coupled to the another component or may be coupled to the another component through other component (for example, a third component) On the other hand, in case that it is mentioned that any component (for example, a first component) is "directly coupled" or "directly connected" to another component (for example, a second component), it is to be understood that the other component (for example, a third component) is not present between any component and another component.

An expression "configured (or set) to" used in the disclosure may be replaced by an expression "suitable for," "having the capacity to," "designed to," "adapted to," "made to" or "capable of" based on a situation. A term "configured (or set) to" may not necessarily indicate "specifically designed to" in hardware.

Instead, an expression "an apparatus configured to" may indicate that the apparatus may "perform~" together with other apparatuses or components. For example, "a processor configured (or set) to perform A, B and C" may indicate a dedicated processor (for example, an embedded processor) for performing the corresponding operations or a general-purpose processor (for example, a central processing unit (CPU) or an application processor) that may perform the corresponding operations by executing one or more software programs stored in a memory apparatus.

In the embodiments, a "module" or a "~er/or" may perform at least one function or operation, and be implemented by hardware or software or be implemented by a combination of hardware and software. In addition, a plurality of "modules" or a plurality of "~ers/ors" may be integrated in at least one module and be implemented by at least one processor (not shown) except for a "module" or an "~er/or" that needs to be implemented by specific hardware.

The electronic device 100 or the user terminal device 200 according to the various embodiments of the disclosure may include, for example, at least one of a smartphone, a tablet personal computer (PC), a mobile phone, a video phone, an e-book reader, a desktop PC, a laptop PC, a net book computer, a workstation, a server, a personal digital assistants (PDA) or a portable multimedia player (PMP).

The various embodiments of the disclosure may be implemented by software including an instruction stored in a machine-readable storage medium (for example, a computer-readable storage medium). A machine may be an apparatus that invokes the stored instruction from the storage medium and may be operated based on the invoked instruction, and may include the electronic device 100 (for example, display device) according to the disclosed embodiments. In case that a command is executed by a processor, the processor may directly perform a function corresponding to the command or other components may be used to perform the function corresponding to the command under a control of the processor. The command may include a code created or executed by a compiler or an interpreter. The machine-readable storage medium may be provided in the form of a non-transitory storage medium. Here, the term "non-transitory" indicates that the storage medium is tangible without including a signal, and does not distinguish whether data are semi-permanently or temporarily stored in the storage medium.

Each of components (for example, modules or programs) according to the various embodiments may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner. Operations performed by the modules, the programs, or other components according to the various embodiments may be executed in a sequential manner, a parallel manner, an iterative manner, or a heuristic manner, or at least some of the operations may be performed in a different order, may be omitted or other operations may be added.

In addition, although the embodiments are shown and described in the disclosure as above, the disclosure is not limited to the above mentioned specific embodiments, and may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device comprising:
a memory that stores at least one instruction; and
a processor that is connected to the memory and configured to execute the at least one instruction to:
acquire feature data of a plurality of images included in a video using a first artificial neural network of a first artificial intelligence model;
acquire a plurality of key frames of the video based on the feature data of the plurality of images using a second artificial neural network of the first artificial intelligence model;
acquire first feature data of remaining key frames excluding at least one of the plurality of key frames using a first artificial neural network of a second artificial intelligence model;
acquire second feature data including information about relationships between the remaining key frames based on the first feature data using a second artificial neural network of the second artificial intelligence model; and
acquire texts for the plurality of key frames based on the second feature data.

2. The electronic device as claimed in claim 1, wherein the feature data comprises action feature data and scene feature data of the plurality of images.

3. The electronic device as claimed in claim 2, wherein the processor is further configured to:
acquire a frame level score of each of the plurality of images based on the action feature data and the scene feature data using the second artificial neural network of the first artificial intelligence model, and
identify one or more key frames of the video from among the plurality of images based on the frame level score.

4. The electronic device as claimed in claim 3, wherein the processor is further configured to identify the one or more key frames based on an image having the frame level score greater than a threshold value.

5. The electronic device as claimed in claim 3, wherein the first artificial neural network of the first artificial intelligence model is a recurrent neural network connected to a convolutional neural network, and
wherein the second artificial neural network of the first artificial intelligence model is a neural network connected to a non-local neural network.

6. The electronic device as claimed in claim 2, wherein the processor is further configured to train the first artificial intelligence model based on the action feature data and the scene feature data of the acquired plurality of key frames.

7. The electronic device as claimed in claim 1, wherein the processor is further configured to:
acquire third feature data including feature data of at least one excluded key frame among the plurality of key frames based on data obtained by adding the first feature data and the second feature data of the remaining key frames, using a third artificial neural network of the second artificial intelligence model, and
acquire texts for the plurality of key frames based on the third feature data using a fourth artificial neural network of the second artificial intelligence model.

8. The electronic device as claimed in claim 7,
wherein the first artificial neural network of the second artificial intelligence model is a convolutional neural network,
each of the second artificial neural network and the third artificial neural network of the second artificial intelligence model is a neural network in which a non-local neural network is connected to a recurrent neural network, and
the fourth artificial neural network of the second artificial intelligence model is the recurrent neural network.

9. The electronic device as claimed in claim 7, wherein the second artificial neural network of the second artificial intelligence model has a same structure as the third artificial neural network, and includes a different parameter.

10. The electronic device as claimed in claim 1, wherein the processor is further configured to train the second artificial intelligence model based on the texts for the acquired plurality of key frames.

11. A control method of an electronic device, the method comprising:
acquiring feature data of a plurality of images included in a video using a first artificial neural network of a first artificial intelligence model;
acquiring a plurality of key frames of the video based on the feature data of the plurality of images using a second artificial neural network of the first artificial intelligence model;
acquiring first feature data of remaining key frames excluding at least one of the plurality of key frames using a first artificial neural network of a second artificial intelligence model;
acquiring second feature data including information about relationships between the remaining key frames based on the first feature data using a second artificial neural network of the second artificial intelligence model; and
acquiring texts for the plurality of key frames, based on the basis of the second feature data.

12. The method as claimed in claim 11, wherein the feature data comprises action feature data and scene feature data of the plurality of images.

13. The method as claimed in claim 12, wherein the acquiring the plurality of key frames of the video comprises:
- acquiring a frame level score of each of the plurality of images based on the action feature data and the scene feature data using the second artificial neural network of the first artificial intelligence model, and
- identifying one or more key frames of the video from among the plurality of images based on the frame level score.

14. The method as claimed in claim 13, wherein the acquiring the plurality of key frames of the video further comprises identifying the one or more key frames based on an image having the frame level score greater than a threshold value.

15. The method as claimed in claim 13, wherein the first artificial neural network of the first artificial intelligence model is a recurrent neural network connected to a convolutional neural network, and
wherein the second artificial neural network of the first artificial intelligence model is a neural network connected to a non-local neural network.

16. A non-transitory computer-readable recording medium including a program for executing a method of an electronic device, the method comprising:
- acquiring feature data of a plurality of images included in a video using a first artificial neural network of a first artificial intelligence model;
- acquiring a plurality of key frames of the video based on the feature data of the plurality of images using a second artificial neural network of the first artificial intelligence model;
- acquiring first feature data of remaining key frames excluding at least one of the plurality of key frames using a first artificial neural network of a second artificial intelligence model;
- acquiring second feature data including information about relationships between the remaining key frames based on the first feature data using a second artificial neural network of the second artificial intelligence model; and
- acquiring texts for the plurality of key frames, based on the second feature data.

* * * * *